United States Patent [19]
Hoblingre et al.

[11] Patent Number: 5,394,767
[45] Date of Patent: Mar. 7, 1995

[54] DEVICE FOR LOCKING IN POSITION AN ADJUSTABLE STEERING COLUMN FOR A MOTOR VEHICLE

[75] Inventors: André Hoblingre, Valentigney; Patrick Courvoisier, Vieux-Charmont, both of France

[73] Assignee: ECIA-Equipements et Composants pour l'Industrie Automobile, Audincourt, France

[21] Appl. No.: 128,574

[22] Filed: Sep. 30, 1993

[30] Foreign Application Priority Data

Oct. 6, 1992 [FR] France ................. 92 11837

[51] Int. Cl.⁶ .......................... B62D 1/18; G05G 5/16
[52] U.S. Cl. ........................... 74/493; 74/99 A; 74/531; 188/72.7
[58] Field of Search ............ 74/99 A, 493, 531; 188/72.7; 192/93 A; 280/775

[56] References Cited
U.S. PATENT DOCUMENTS 4,244,237  1/1981  Sprunger ..................... 74/493
5,088,767  2/1992  Hoblingre et al. .......... 74/493

FOREIGN PATENT DOCUMENTS 242928   10/1987  European Pat. Off. .
427584    5/1991  European Pat. Off. .
443910    8/1991  European Pat. Off. .
493181    7/1992  European Pat. Off. .
4016163  11/1991  Germany .
2113164   8/1983  United Kingdom .

Primary Examiner—Allan D. Herrmann
Attorney, Agent, or Firm—Sughrue, Mion, Zinn, Macpeak & Seas

[57] ABSTRACT

A support structure is provided with two flanges (41,42) between which the steering column (43) is arranged. A device for locking the column by moving the flanges together has a tie (40) extending between the flanges, one end of which is associated with locking members including a stop member (44) for the tie, an intermediate bearing member (45) in contact with one flange, and a spacing assembly (46) arranged between the two members. The spacing assembly includes at least one rolling member (48,49) between the facing surfaces of the members, and a cage (50) for displacing this rolling member along an incline (52) provided on the corresponding surface of the intermediate bearing member (45). At least part of the tie connected to the stop member can be displaced rotationally so as to follow the displacements of the rolling member.

9 Claims, 3 Drawing Sheets

1

DEVICE FOR LOCKING IN POSITION AN ADJUSTABLE STEERING COLUMN FOR A MOTOR VEHICLE

BACKGROUND OF THE INVENTION

The present invention relates to a device for locking in position an adjustable steering column, especially for a motor vehicle, and to a column assembly including such a device.

Some motor vehicles have, for several years already, been equipped with devices for adjusting the position of the steering wheel, which are intended to adapt the position of the latter to the morphology of the driver of the vehicle.

Thus the position of the column and therefore of the steering wheel is adjustable axially, and by pivoting.

In the state of the art, these adjustment devices include a column-support structure connected to the rest of the structure of the vehicle and including two flanges between which the column is arranged and means for locking the column in position by bringing the flanges together.

These locking means comprise, for example, a tie extending between the flanges, a first end of which bears on one of the flanges and a second end of which is connected to locking elements.

Various embodiments of these locking elements have been proposed.

Thus, for example, these locking elements may consist of a screw-nut system, a toggle joint system, or even a system with a cam connected to a manipulating lever.

Another embodiment of these locking means is described in document GB-A-2,113,164 in the name of FORD MOTOR COMPANY LIMITED.

This document in effect describes a device the general structure of which is in the form described previously and in which the locking elements comprise a stop member at the second end of the tie, an intermediate bearing member in contact with the other flange of the support structure and capable of being displaced axially on the tie, and a manipulating member arranged between the stop member and the intermediate bearing member, connected to a manipulating lever, and capable of being displaced rotationally in a plane which is perpendicular to the tie, between an active position for locking the column, and a retracted position for unlocking it.

The facing surfaces of the manipulating member and of the intermediate bearing member or of the stop member comprise, for one of them, at least one projecting part which is adapted to interact with an incline on the other, in order to space these two surfaces apart and therefore to space apart the corresponding locking elements in order to bring the flanges closer together to lock the column, when the manipulating lever is displaced.

In the embodiment described in this document, the projecting parts consist of bosses formed integrally with the manipulating member and the inclines are made on the intermediate bearing member.

However, this device exhibits a certain number of drawbacks as regards manipulating the lever.

In effect, it is understood that the greater the tightening of the column to be obtained, the greater the friction between these various locking elements and therefore the more difficult the manipulation of the lever.

Document FR-A-2,671,040 in the name of the Applicant Company proposes various solutions for solving these problems.

To this end, this document relates to a locking device as described previously, in which the said projecting part comprises a rolling member connected to the corresponding locking element.

Two rolling members may be arranged on the corresponding locking element, on either side of the tie, and may each be adapted to interact with a facing incline on the corresponding surface of the other element.

Advantageously, these rolling members are interposed between the manipulating member and the intermediate bearing member, and rolling-contact bearing elements are interposed between the stop member and the manipulating member.

According to a particularly advantageous embodiment described in this document, the or each rolling member interposed between the manipulating member and the intermediate bearing member, and the or each rolling-contact bearing interposed between the manipulating member and the stop member of the second end of the tie, are arranged in pairs in a single recess passing through the manipulating member, bearing one against the other, one projecting between the manipulating member and the intermediate bearing member and the other between the manipulating member and the stop member.

It is mentioned in this document that these members and these rolling-contact elements may consist of balls.

However, the various embodiments described in this document, although offering a certain number of advantages as compared with conventional devices, remain the source of friction and wear of components and in particular of the rolling members and rolling-contact elements, which over time is manifested by problems in operating the device.

Of course, these problems may be solved by using components which offer suitable mechanical strength characteristics, but this is often manifested in an increase in the costs of manufacturing the device.

SUMMARY OF THE INVENTION

The object of the present invention is to solve these problems of wear by proposing a device which is simple and reliable and whose cost price is as low as possible.

To this end, the subject of the invention is a device for locking in position an adjustable steering column, especially for a motor vehicle, of the type including a column-support structure connected to the rest of the structure of the vehicle and including two flanges between which the column is arranged, and means for locking the column in position by bringing the flanges together, comprising a tie extending between the flanges, a first end of which includes means for bearing on one of the flanges and a second end of which is connected to locking elements comprising a stop member, at the second end of the tie, a first intermediate bearing member in contact with the other flange of the support structure and capable of being displaced axially on the tie, and spacing means arranged between the stop member and the intermediate bearing member, which are connected to manipulating means and are capable of being displaced rotationally in a plane which is perpendicular to the tie between an active position for locking the column and a retracted position for unlocking it, characterized in that the spacing means comprise at least one rolling member arranged between the facing surfaces of this intermediate bearing member and this stop member, and means for displacing this rolling member along an incline provided on the corresponding surface of the intermediate bearing member, these displacement means being connected to the manipulating means and being capable of being displaced rotationally about the tie to make the rolling member space apart these facing surfaces of the intermediate bearing member and of the stop member, in order to bring the flanges closer together and lock the column in position, and in that at least part of the tie connected to the stop member can be displaced rotationally so as to follow the displacements of the said at least one rolling member.

According to another aspect, the subject of the invention is also a position-adjustable steering column assembly for a motor vehicle, characterized in that it includes a locking device, according to any one of the accompanying claims.

The invention will be better understood with the aid of the description which will follow, given solely by way of example and made with reference to the appended drawings in which:

DESCRIPTION OF A PREFERRED EMBODIMENT

Figure 1:
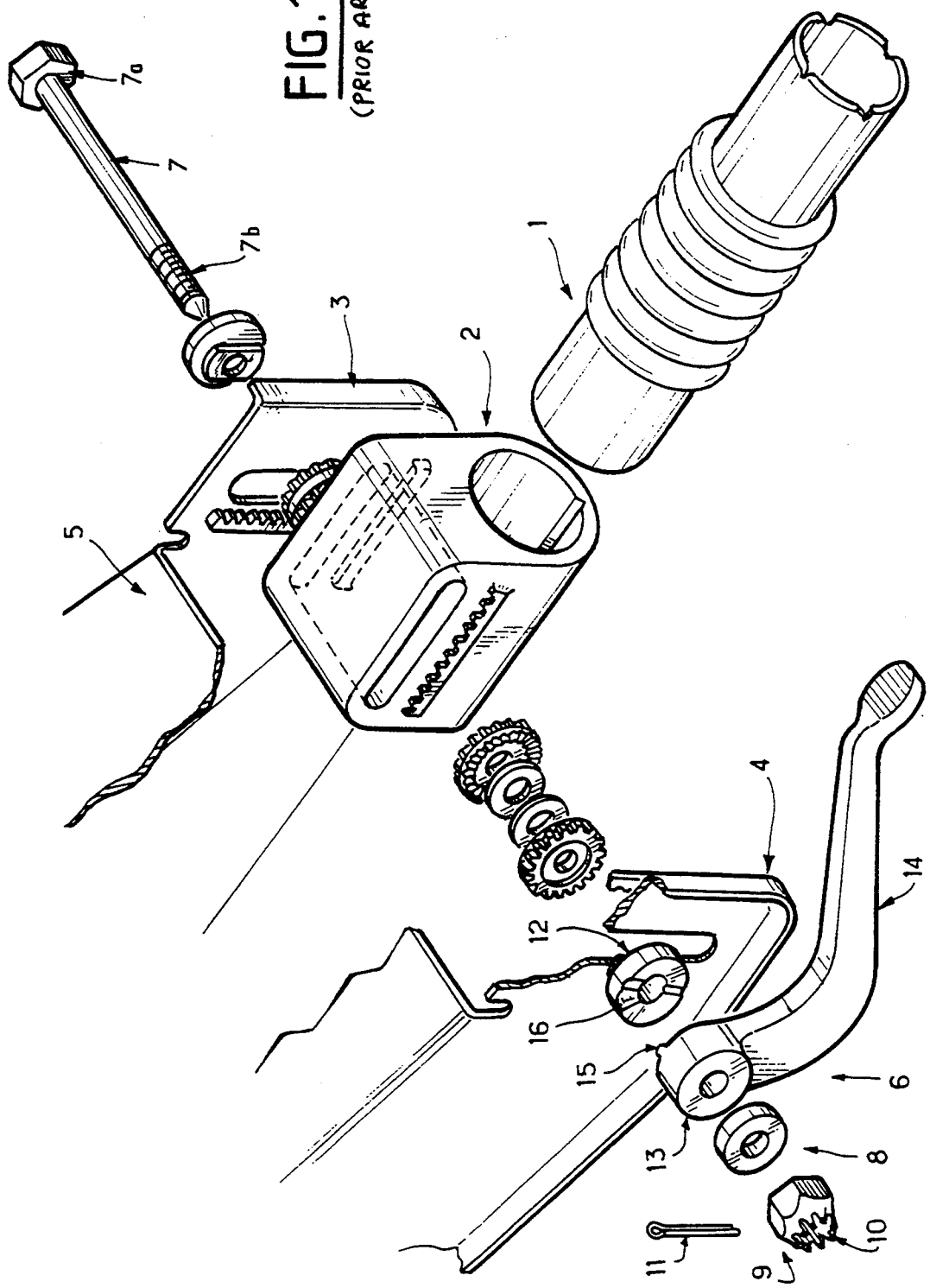
FIG. 1 represents an exploded perspective view of a prior art device for locking an adjustable vehicle steering column in position, described in document GB-A-2,113,164.

As can be seen in FIG. 1, which represents a device for locking an adjustable vehicle steering column 1 in position, described in document GB-A-2,113,164, this column 1 is arranged in a linking member 2 interposed between the flanges 3 and 4 of a column-support structure 5, connected to the rest of the structure of the vehicle by any suitable means.

This device also includes means 6 for locking the column in position by moving the flanges 3 and 4 of the support structure closer together. These locking means comprise, for example, a tie 7 extending between the two flanges 3 and 4 of the support structure and a first end 7a of which bears on one of the flanges, for example 3, and the other end 7b of which is connected to locking elements 8.

These locking elements comprise a stop member 9 consisting for example of a nut 10 associated with a pin 11, and arranged at the second end 7b of the tie 7, an intermediate bearing member 12 in contact with the other flange 4 of the support structure and capable of being displaced axially on the tie 7, and finally a manipulating member 13 arranged between the stop member 9 and the intermediate bearing member 12, connected to a manipulating lever 14, and capable of being displaced rotationally in a plane which is perpendicular to the tie 7, between an active position for locking the column and a retracted position for unlocking it.

In the embodiment represented in this figure, the facing surfaces of the manipulating member 13 and of the intermediate bearing member 12 include, for one of them, projecting parts 15 adapted to interact with inclines 16 on the other one, so as to space these two surfaces apart from one another and therefore to space apart the corresponding locking elements in order to bring the flanges closer together to lock the column in position, when the manipulating lever is displaced.

Figure 2:
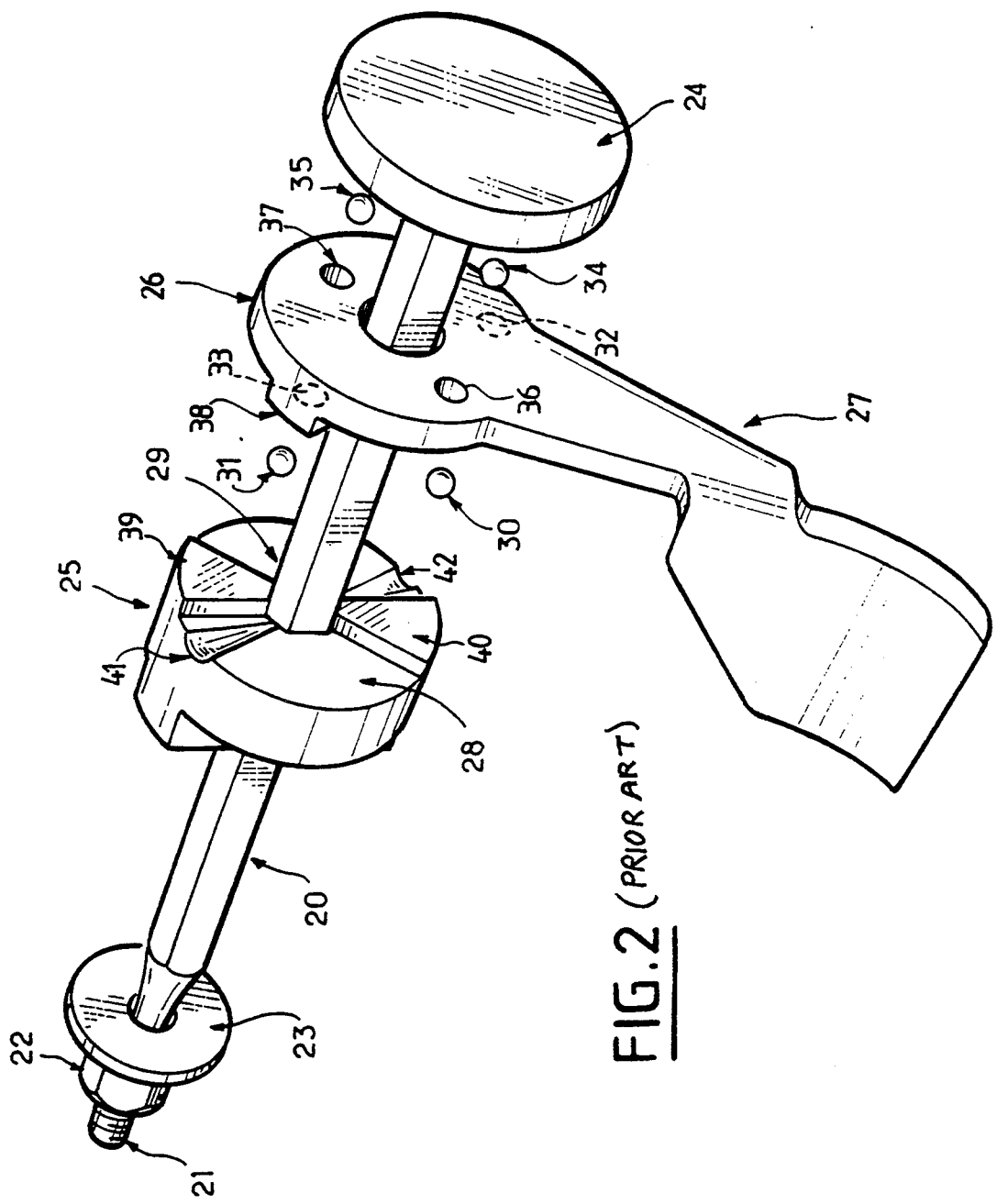
FIG. 2 represents a perspective view of a prior art embodiment of locking means entering into the composition of a locking device described in document FR-A-2,671,040.

If reference is now made to FIG. 2, which represents a perspective view of locking means entering into the composition of a locking device described in document FR-A-2,671,040, it can be noticed that these means also include a tie 20 one of the ends 21 of which is threaded and adapted to interact with a nut 22 and a washer 23 for bearing on one of the flanges of the support structure.

It will be noted that the parts of the device which are not described with regard to this figure may be identical to those described with regard to FIG. 1.

The other end of the tie carries locking elements which comprise a stop member 24 consisting for example of a stop plate fixed to the corresponding end of the tie 20, and an intermediate bearing member 25 adapted to press against the other flange of the support structure, this intermediate bearing member being mounted so that it can be displaced axially on the tie.

These locking elements also comprise a manipulating member 26 which is arranged between the stop member 24 and the intermediate bearing member 25, is connected to a manipulating lever 27 and is capable of being displaced rotationally in a plane which is perpendicular to the tie 20 between an active position for locking the column and a retracted position for unlocking it.

As can be noticed, the surface of the intermediate bearing member 25 facing the manipulating member includes inclines 28 and 29, which are for example diametrically opposed, which are adapted to interact with projecting parts on the corresponding surface of the manipulating member 26.

More particularly, these projecting parts may consist of rolling members connected to this manipulating member, these rolling members consisting, for example, of balls 30 and 31 arranged in recesses 32 and 33 repectively, made in the corresponding surface of the manipulating member 26.

It is indicated in this document that rolling-contact elements consisting, for example, of balls 34 and 35 may also be arranged between the stop member 24 and the manipulating member 26.

These balls are, for example, arranged in recesses 36 and 37 made in the corresponding surface of the manipulating member 26, facing the stop member 24.

The displacement of the manipulating member 26 and therefore of the manipulating lever 27 is facilitated insofar as these rolling members and rolling-contact bearing elements facilitate the displacement of the various locking elements with respect to one another.

The rolling-contact bearing elements 34 and 35 keep the manipulating member 26 in the correct position with respect to the stop member 24 while facilitating the displacement of the manipulating member while the rolling members 30 and 31 move over the inclines 28 and 29 of the intermediate bearing member 25 in order to space the facing surfaces of this intermediate bearing member and of the manipulating member apart, so as to space apart these locking elements in order to bring the flanges closer together and to lock the column in position when the manipulating member 26 is displaced.

As was indicated previously, these devices of the state of the art exhibit a certain number of drawbacks.

Figure 3:
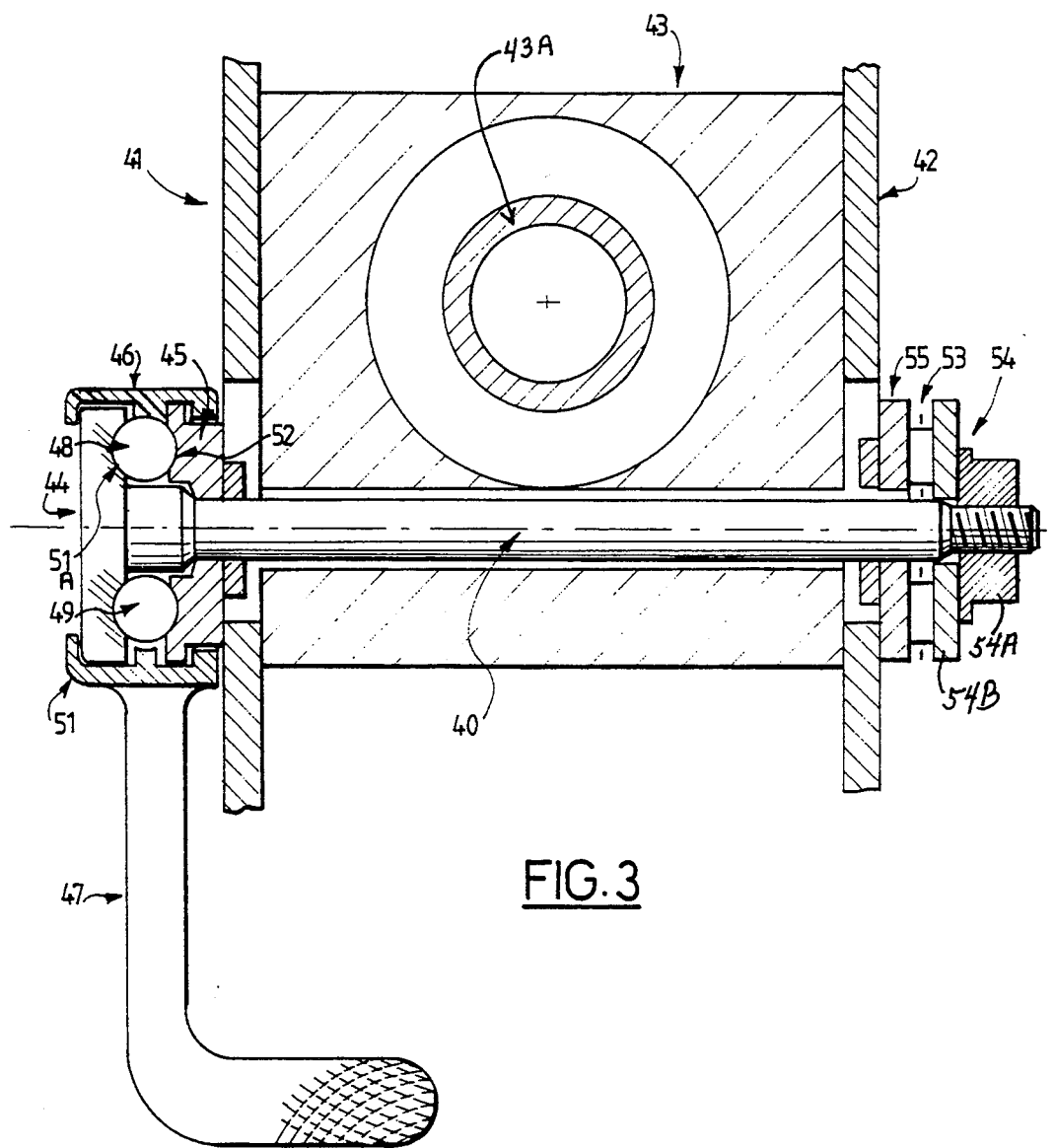
FIG. 3 represents a sectional view of an embodiment of locking means entering into the composition of a locking device according to the invention.

FIG. 3 represents an embodiment of locking means entering into the composition of a locking device according to the invention.

These locking means still comprise a tie 40 extending between flanges 41 and 42 of a steering column-support structure which is denoted by the general reference 43 and which supports a steering column 43A.

One of the ends of the tie 40 is adapted so as to interact with the flange 41 and includes a stop member 44 and a first intermediate bearing member 45 which can be displaced axially on the tie 40, in contact against the flange 41 and locked rotationally with respect to it. Spacing means 46 are arranged between this intermediate bearing member and this stop member and are connected to a manipulating lever 47 to as to lock the column in position.

These spacing means comprise at least one rolling member, and, in the example illustrated, two rolling members 48 and 49, each consisting, for example, of a ball, which are arranged on either side of the tie between facing surfaces of the intermediate bearing member 45 and of the stop member 44.

Means 50 are provided for displacing the or each rolling member 48, 49 along a corresponding incline provided on the corresponding surface of the intermediate bearing member 45.

The or each incline may for example consist of an incline similar to the incline 28 or 29 of the intermediate bearing member 25 described with reference to FIG. 2.

These displacement means 50 which advantageously comprise a cage for displacing the or each rolling member are connected to the manipulating lever denoted by the overall reference 47 in this figure and are mounted so that they can be displaced rotationally about the tie 40 to make the or each rolling member 48, 49 space apart these facing surfaces of the intermediate bearing member 45 and of the stop member 44, in order to bring the flanges closer together and lock the column in position.

In the embodiment represented in this FIG. 3, the displacement means 50 consisting of the cage are connected to a protective cap 51 arranged around the locking means and capable of moving rotationally about these, and the manipulating lever 47 is formed integrally with this cap.

It will also be noted that the or each rolling member is mounted so that it can be displaced between the corresponding incline of the intermediate bearing member 45 and a corresponding groove 51A made in the surface of the stop member 44 facing the surface of the intermediate bearing member on which the or each incline is provided.

Of course, this incline may equally well be formed by the bottom of a groove 52 for receiving the or each ball, made in this member.

The use of these grooves makes it possible to obtain a better distribution of loads over a greater contact surface between the corresponding components.

At least part of the tie connected to the stop member, and more particularly, in the embodiment represented in this FIG. 3, the whole of the tie 40, is mounted so that it can rotate in the flanges of the support structure so as to follow the displacements of the or each rolling member in order to reduce the various frictions due to these displacements.

Rolling-contact bearing means consisting, for example, of a thrust needle bearing 53 may therefore be arranged at the other end of the tie 40 between bearing means 54 comprising, for example, a nut 54A and a washer which are rotationally locked on this tie 40, and a second intermediate bearing member 55 in contact against the other flange 42 and rotationally locked with respect to it.

It can therefore be understood that the various loads exerted on the various components of this device are distributed over larger contact surfaces between the first intermediate bearing member 45, the or each rolling member 48, 49, the stop member 44, the bearing means 54 for the tie, the rolling-contact bearing means 53 and the second, intermediate, bearing member 55, which makes it possible to reduce the wear of these components and to use components made from conventional materials, that is to say ones which do not have to undergo costly metallurgical treatments intended to increase their mechanical strength characteristics.

Indeed, displacement of these locking means between their retracted position and their active position is produced by displacing the or each rolling member by virtue of the lever and of the displacement cage connected to it, the stop member, the tie, the bearing means and the rolling-contact bearing means following this displacement to prevent any friction between these components.

The only friction which remains in the device according to the invention is therefore the friction between the or each rolling member and the cage for displacing it, when the lever is manipulated.

Of course, various arrangements of these components may be envisaged, and it is also possible to provide various means for limiting the displacement travel of the lever, for example by virtue of complementary projecting parts of the intermediate bearing member and of the cage for displacing the rolling member or by virtue of recesses in the incline and/or in the groove to make the user feel a discontinuity in load, as is mentioned in the document FR-A-2,671,040. These recesses also make it possible, for example, to keep the device in the locked position.

Finally, it goes without saying that manipulating means other than a lever may be used, for example assisted displacement means, controlled for example by a user, as is described in French Patent Application No. 92 02 101 filed on 24 Feb. 1992 in the name of the Applicant Company.

We claim:

1. Device for locking in position an adjustable steering column, for a motor vehicle, of the type including a column-support structure (43) connected to the vehicle and including two flanges (41, 42) between which the column (43A) is arranged, and means for locking the column in position, by bringing the flanges together, and comprising a tie (40) extending between the flanges, a first end of which includes means (54) for bearing on one of the flanges (42) and a second end of which is connected to locking elements comprising a stop member (44), at the second end of the tie, a first intermediate bearing member (45) in contact with the other flange (41) of the support structure and capable of being displaced axially on the tie, and spacing means (46) arranged between the stop member and the intermediate bearing member, which are connected to manipulating means (47) and are capable of being displaced rotationally in a plane which is perpendicular to the tie between an active position for locking the column and a retracted position for unlocking it, wherein the spacing means comprise at least one rolling member (48, 49)

arranged between facing surfaces of said intermediate bearing member and said stop member and means (50) for displacing said rolling member along an incline (52) provided on the corresponding surface of the intermediate bearing member, said displacement means being connected to the manipulating means and being capable of being displaced rotationally about the tie to make the rolling member (48, 49) space apart said facing surfaces of the intermediate bearing member and of the stop member, in order to bring the flanges closer together and lock the column in position, and wherein at least part of the tie connected to the stop member (44) can be displaced rotationally so as to follow the displacements of said at least one rolling member.

2. Device according to claim 1, wherein the whole of the tie can be displaced rotationally between the flanges, and wherein rolling-contact bearing means (53) are interposed between the bearing means (54) for the first end of the tie and a second intermediate bearing member (55) in contact with the corresponding flange (42).

3. Device according to claim 1, wherein the or each rolling member (48, 49) is formed by a ball.

4. Device according to claim 1, wherein the or each rolling member is mounted so that it can be displaced between the incline (52) provided on the surface of the first intermediate bearing member and a groove (51) for receiving said rolling member made in the corresponding surface of the stop member.

5. Device according to claim 1, wherein the or each incline (52) is formed by the bottom of a groove for receiving the member.

6. Device according to claim 1, wherein the rolling-contact bearing means (53) comprise a thrust needle bearing.

7. Device according to claim 1, wherein the displacement means comprise a cage (50) for displacing said at least one rolling member.

8. Device according to claim 1, wherein the displacement means are connected to a protective cap (51) arranged around the locking means and capable of moving rotationally about them, the manipulating means being formed by a manipulating lever (47) formed integrally with this cap.

9. Position-adjustable steering column assembly for a motor vehicle, comprising a device for locking the column in position, according to claim 1.

* * * * *